United States Patent
Shah et al.

[11] Patent Number: 5,208,046
[45] Date of Patent: May 4, 1993

[54] NOZZLE APPARATUS FOR GAS ASSISTED INJECTION MOLDING

[76] Inventors: Chandrakant S. Shah, 4433 Clarke, Troy, Mich. 48098; Verman Sarbjit, 32 Graham Place, Lambeth, Ontario, Canada

[21] Appl. No.: 755,672
[22] Filed: Sep. 6, 1991
[51] Int. Cl.⁵ .............................................. B29C 45/23
[52] U.S. Cl. ................................... 425/130; 264/572; 425/562; 425/564
[58] Field of Search ............... 425/130, 562, 563, 564, 425/565, 566; 264/572

[56] References Cited

U.S. PATENT DOCUMENTS

| | | | |
|---|---|---|---|
| 4,944,910 | 7/1990 | Hendry | 264/572 |
| 5,030,076 | 7/1991 | Ebenhofer et al. | 264/572 |
| 5,080,570 | 1/1992 | Baxi et al. | 264/572 |

*Primary Examiner*—Tim Heitbrink
*Attorney, Agent, or Firm*—James H. Bower

[57] ABSTRACT

A nozzle for injection molding of thermoplastic viscous fluid materials which includes a nozzle body having a bore to provide a flow path. One end of the nozzle body is adapted for viscous fluid connection with a sprue of an associated mold body, and the other end is adapted for viscous fluid connection with an end of an associated injection molding machine. The nozzle body includes within its bore, a shut-off valve non-viscous fluid pin housing assembly which is adapted for reciprocating movement in the nozzle body. The fluid pin housing has a tip portion and a non-viscous fluid passage formed in the housing and open at the tip portion and the other end of the non-viscous fluid passage communicating with an associated source of pressurized non-viscous fluid. An actuator is provided for reciprocating within the nozzle body of the shut-off valve fluid pin housing to an open or closed position controlling the flow of viscous plastic through the nozzle body. The fluid pin housing tip portion located in the non-viscous passage of the fluid pin housing having a fixed or adjustable non-viscous fluid pin. The shaping of the fluid pin tip in the non-viscous fluid passage outlet provides different fluid flow during discharge and later exhaust of non-viscous fluid.

14 Claims, 2 Drawing Sheets

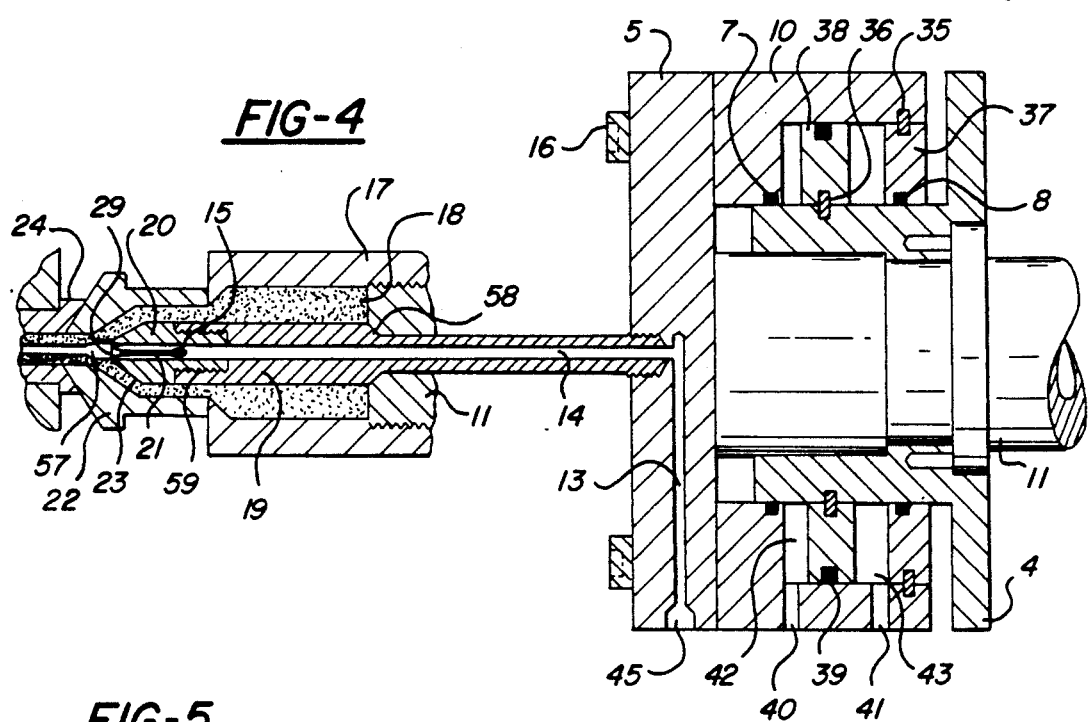
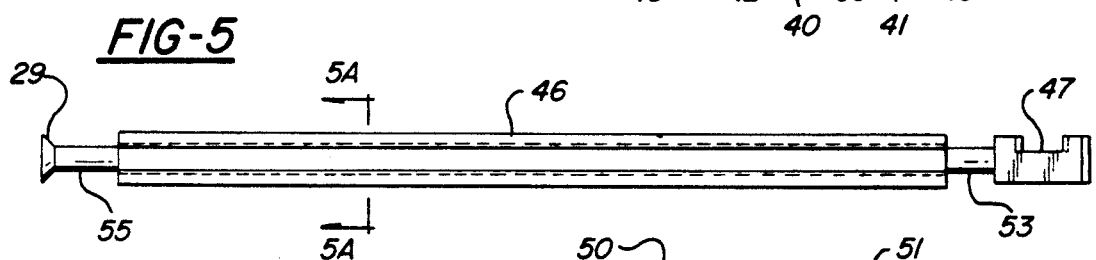
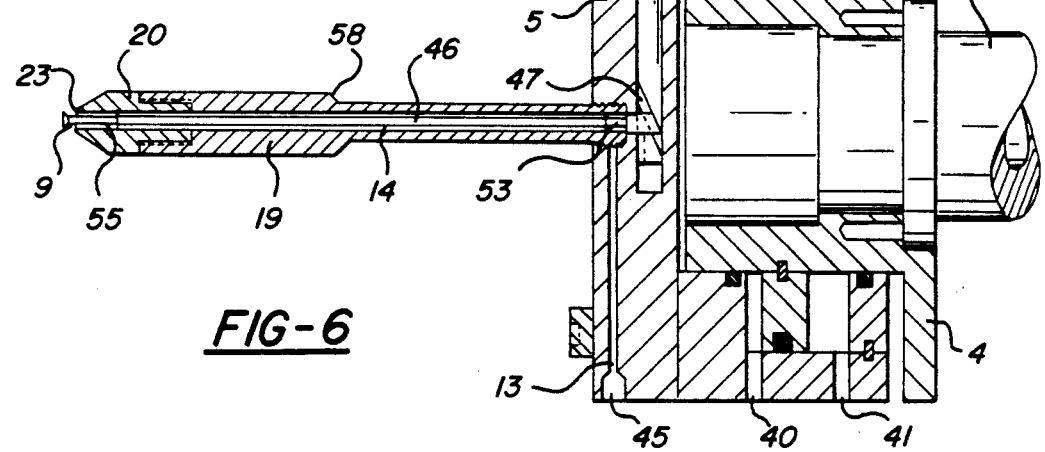

NOZZLE APPARATUS FOR GAS ASSISTED INJECTION MOLDING

SUMMARY OF THE INVENTION

The present invention relates to an apparatus for injection molding thermoplastic materials. More specifically the invention relates to a shut-off nozzle for the injection molding of molten thermoplastic materials in which a pressurized fluid is introduced into the molten mass during the injection process.

In injection molding, it is known that to urge the molten thermoplastic in an injection mold outwardly into contact with the mold surfaces by exerting pressure on the plastic material is an advantage. This pressure aids the external surface of the plastic material in assuming the precise shape dictated by the mold surface. Such pressure may be applied by a fluid, such as nitrogen gas, which is injected into the molten plastic in the mold space. The fluid injected part has the further advantage of using less plastic and is lighter than if the part were solid plastic.

Of more importance is that the plastic will not have a tendency to shrink away from the mold walls during cooling since an internal fluid pressure will keep it expanded against the walls.

The above process is often called fluid injection molding where the fluid is a non viscous gas or liquid. The gas may be gaseous nitrogen and the liquid heated and pressurized water.

After the fluid is injected, a pressure is maintained on the fluid in the hollow fluid space in the mold cavity until the molten plastic has set due to cooling. The mold then is released of the pressurized fluid in the hollow area and the molded part is then taken out of the mold cavity.

The prior art valve assemblies have the disadvantage that the fluid control, as the fluid enters the sprue area and molten plastic stream, is not adjustable for various conditions and plastics. Also during decompression of the mold, the fluid passage may be used resulting in molten plastic remaining in the nozzle or mold space being vented back along with the gas. This condition may clog the fluid lines downstream from the nozzle and the nozzle becomes unusable until it is cleaned out, which is time consuming and expensive.

In view of the foregoing problems, it is considered desirable to develop a new and improved injection molding nozzle which would overcome the above while providing better and more advantageous overall results.

It is a further object to provide a nozzle having an adjustable fluid orifice during the gas injection and venting operation preventing thermoplastic material flowing through the fluid bore.

Another advantage of the invention is the ability to exhaust the cavity and reinject a small quantity of plastic in the hollow core to seal the opening, while maintaining the fluid bore closed preventing the entry of plastic.

BRIEF DESCRIPTION OF THE DRAWINGS

FIG. 4 is an enlarged side elevational cross-sectional view of part of the nozzle assembly of FIG. 1, also with the shut-off valve fluid pin housing shown in the open position, with the flow of molten plastic and fluid flow entering the nozzle and sprue bushing;

FIG. 5 is an enlarged top view of the adjustable fluid pin of FIG. 6;

FIG. 5A is an enlarged cross-sectional view through the pin of FIG. 5 along lines 5A—5A; FIG. 5B is an alternate pin cross-sectional view through the pin of FIG. 5 along lines 5A—5A; and FIG. 6 is a side elevational cross-sectional view of part of the nozzle assembly using the adjustable pin of FIG. 5 within the bore of the shut-off valve fluid pin housing and the associated pin actuator.

DETAILED DESCRIPTION OF THE INVENTION

Figure 1:
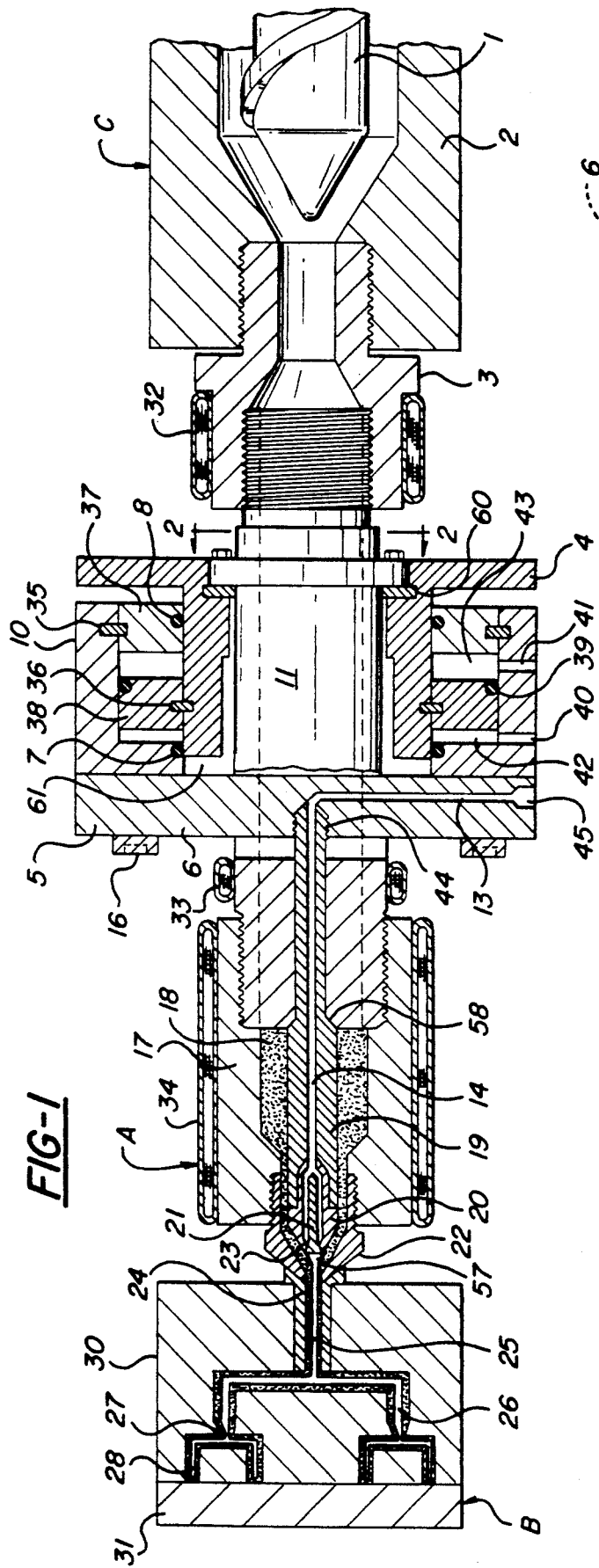
FIG. 1 is a side elevational view in cross section of the nozzle assembly connected between a mold body and a screw ram of an injection molding apparatus with a shut-off valve fluid pin housing shown in the open position.
Figure 2:
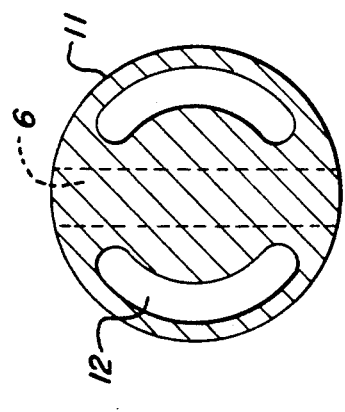
FIG. 2 is an enlarged cross-sectional view through the main body of FIG. 1 along lines 2—2.

Referring to the drawings, FIG. 1 shows the new nozzle assembly A connected between a mold body B and a screw ram C of an injection molding device.

The nozzle assembly A includes a shut-off nozzle having a nozzle tip 22 in seal contact with sprue bushing 24. Nozzle tip 22 has a threaded body and is connected to front coupling nozzle body 17 which in turn is connected to main body 11. Extending through nozzle tip 22 and front coupling nozzle body 17 to main body 11 is a longitudinal bore 18. Bore 18 provides a passage for molten plastic between passage 12 in the main body 11 to the injection molding machine connector 3 which is attached to machine barrel 2.

Also located within bore 18 is a second nozzle assembly having a shut-off valve fluid pin housing 19 which reciprocates within bore 18.

Shut-off valve fluid pin housing 19 extends along the longitudinal axis of bore 18 and nozzle body 17 and is connected to cylinder attachment 5 by way of threaded connection 44, which is transverse to the longitudinal axis of bore 18. Also, within housing 19 is longitudinal bore 14, which communicates with transverse bore 13 in cylinder attachment 5, and inlet 45. The second nozzle assembly having a plurality of fasteners 16 attaching the cylinder attachment 5 to cylinder body 10.

As shown in FIG. 1 and 4, cylinder body 10 is attached to movable cylinder attachment 5 which is secured to cylinder end 37 by key 35. Located within cylinder body 10, and having a flange for attachment to main body 11 and the injection molding machine C, is stationary piston assembly 4. Piston end plate 38 is attached to the stationary piston assembly 4 by means of key 36. Formed within movable cylinder body 10 and stationary piston assembly 4 are chambers 42 and 43 having inlet and exhaust ports 40 and 41. Also provided is O-ring seals 7 and 8 to seal the movable cylinder body 10 from stationary piston assembly 4 together with O-ring seal 39 preventing leakage of fluid from chambers 42 and 43.

The cylinder body and piston assembly forming chambers 42 and 43 are in fluid contact through ports 40 and 41 with a suitable source of pressurized fluid, which is controlled by a conventional valve element (not shown). Thus as pressurized fluid enters port 40, and port 41 is vented, the movable cylinder body 10 moves to the left. The opposite is true when pressurized fluid enters chamber 43 through port 41 and chamber 42 is ported to exhaust through port 40, moving cylinder body 10 to the right, as shown in FIGS. 1 and 4.

As illustrated in FIG. 1, pressurized fluid in chamber 43 causes movement of the cylinder attachment 5, within slot 6 of main body 11, and hence the shut-off valve fluid pin housing 19 moves rearward to open bore 23 in a pin tip 20 connected to housing 19 via threads 59. In the rearward position, housing 19 seals at surface 58 against the main body 11. When housing 19 is moved forward, a seal is established at surface 23 between pin tip 20 and nozzle tip 22 within bore 18.

This seal prevents the flow of thermoplastic material from the injection molding machine C through the nozzle assembly A and into the mold body B. The seal 23 is a line contact to prevent drooling of molten plastic during material shut-off.

In reference to FIG. 1, when it is desired to flow plastic into mold body B, a hydraulic screw ram 1 of the screw ram assembly C is actuated thereby pressurizing a type of thermoplastic material which is caused to flow through passage 12 of the main body 11 and into the longitudinal bore 18 of the nozzle assembly front coupling 17.

The housing 19 is then moved rearward, by pressurized fluid in chamber 43. When this happens, the bore 18 is opened at pin tip 20 at seal surface 23 and thermoplastic material is allowed to flow into sprue 24 of the mold body. The molten plastic material then flows into hollow cored sprue 25 and runner 26 to gate section 27 between a pair of mold halves 30 and 31.

To keep the plastic material in a molten state as it flows through the nozzle assembly, electric heater elements 32, 33 and 34 may be affixed around the outer periphery as illustrated in FIG. 1 or internally through a cartridge rod (not shown).

After the molten plastic has begun to flow into the sprue, a pressurized fluid, such as nitrogen gas is allowed to flow through bore 13 into bore 14 in shut-off pin 19 and around adjustable stationary pin 21 and past conic section pin tip 29 through orifice 9, to create a fluid cavity 57 in the molten plastic material flowing into mold cavity 28. The pressurized fluid is supplied to inlet port 45 by a conventional source of fluid, such as a tank of nitrogen, or other suitable fluid (not shown).

When the proper amount of molten plastic material has been charged into mold cavity 28, the cylinder body 10 can be actuated by providing pressurized fluid to port 40 and port 41 is vented. With reference to FIGS. 1 and 4, this will actuate the cylinder attachment 5 to move forward and push valve pin 19 forward into sealing relationship with nozzle tip 22 at seal surface 23 on pin tip 20, thereby shutting off the flow of molten plastic through nozzle tip 22. It should be noted that the flow of pressurized fluid in bore 14 can continue, unabated even after the flow of plastic has stopped.

Figure 3A:
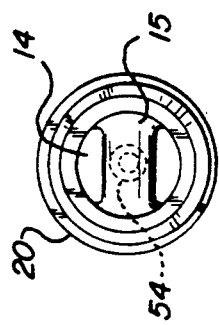
FIG. 3A is an enlarged cross-sectional view of one end of the shut-off nozzle tip of FIG. 3 along lines 3A—3A.
Figure 3:
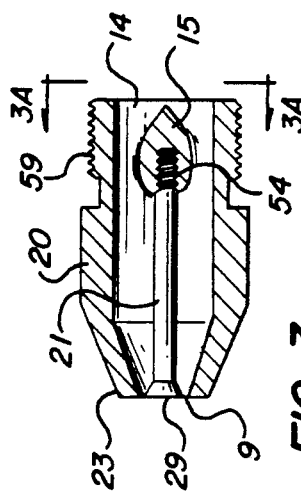
FIG. 3 is an enlarged side elevational view in cross-section of the shut-off nozzle tip.

The flow of pressurized fluid is controlled in the first embodiment of FIGS. 1, 3 and 4 by a special shaped stationary pin 21, that is adjustable by the person skilled in the area of injection molding, for a particular thermoplastic and mold set up. Stationary pin 21 is adjustable in pin support 15 by having inner threading 54. Pin support 15 is centrally located within the front tip 20 of housing 19. Pin 21 having a special shaped conic section 29 opposite pin support 15, forming orifice 9 with the bore wall of pin tip 20. The conic section 29 having an angle flare of between 1° to 89° angle is attached to pin 21 and adjusted by turning pin 21 in or out as desired.

The shape of orifice 9 together with the angle of conic section tip 29 changes the coefficient of fluid discharge. Orifice 9 is shaped to have a larger coefficient of discharge (larger flow) during inflow of fluid, and smaller coefficient (less flow) during exhaust. The flow during part of exhaust is choked due to sound velocity occurring at orifice 9.

When the plastic material has cooled and set in the mold cavity, the pressurized fluid may be vented.

To vent fluid from mold cavity 28, port 45 is opened by the provision of a suitable valve means and fluid is exhausted back through orifice 9 and bore 14 and 13. Since orifice 9 has a smaller coefficient of discharge during exhaust, passage of fluid will be reduced and prevent the flow of plastic through the valve body fluid passage.

With reference to FIG. 6, an alternate embodiment of fluid pin means is shown. For ease of illustration and appreciation, like components are identified by like numerals.

FIG. 6 embodiment contains a shut-off valve fluid pin housing 19 having within its bore 14 an elongated pin 46 shown in FIG. 5 enlarged. Fluid pin 46 may be adjusted forward and back during the molding operation, thereby adjusting the size of orifice 9 from full open to closed and all positions between changing the coefficient of discharge of fluid in and out of mold cavity 28.

Pin 46 has a discharge tip 29 and a tapered slot 47 at the opposite end. Cylinder attachment 5 has gas pin actuator 50 having a piston rod 52 with a tapered boss that fits in tapered slot 47 so that movement of the piston rod up and down moves pin 46 in and out having a finite adjustment of movement from 0.001 cm to 1 cm. Actuator 50 is actuated through port 51 and 62.

For nonviscous fluid to flow in pin 46, a reduced diameter 53 is provided and a reduced area 55 allows mixing prior to passing out orifice 9.

FIG. 5A is a cross-section of pin 46 having four fluid passages 48 while FIG. 5B is an alternative embodiment fluid pin 56 having two fluid passages 49. The groove or opening 48 in pin 46 may be a slot or semicircle depending on the volume of fluid to pass and the ease of manufacture. However, it is understood that the shapes of the fluid passages in pin 46 shaft are not limited to those shown in FIGS. 5A and 5B.

It is noted in FIG. 1, that insulation 60 is shown to keep heat from main body 11 being in direct contact with stationary piston assembly 4. Also, an air gap 61 helps prevent heat transfer between the main body 11 and piston assembly 4.

It will be understood that changes and modifications could be made to the nozzle assembly without departing from the inventive subject matter as disclosed herein. It is intended to include all changes and modifications insofar as they come within the scope of the appended claims or equivalents thereof.

We claim:

1. A nozzle apparatus for injecting a viscous fluid and a non-viscous fluid comprising:

a nozzle body having a bore with an inlet end and a discharge end to establish a flow passage for said viscous fluid extending from said inlet end to said discharge end;

valve means for reciprocating in said nozzle body flow passage to control a flow of said viscous fluid through said nozzle body discharge end; and actuator means for selectively actuating said valve means to an open or closed position, said reciprocating valve means having a bore located longitudinal within said reciprocating valve means to provide a flow passage for non-viscous fluid and having a pin means located within said flow passage providing an orifice at said flow passage discharge end.

2. A nozzle apparatus for molding a plastic article using a molten thermoplastic and a non-viscous fluid gas comprising:

a nozzle body having a bore with an inlet end and a discharge end to establish a flow passage for said molten thermoplastic extending from said inlet end to said discharge end;

a shut-off valve body for reciprocating within said nozzle body flow passage to either open or close said passage discharge end; and actuator means for selectively actuating said shut-off valve body;

said reciprocating shut-off valve body having a longitudinal bore to provide passage of fluid gas from an external source to a discharge tip orifice;

said valve body bore having mounted within its passage an adjustable gas pin having a gas pin actuator for finite movement of said pin;

said pin having a conical end section at said discharge tip orifice.

3. A nozzle for the injection molding of fluid plastics comprising:

a nozzle body having a bore with an inlet end and a discharge end to establish a flow passage for fluid thermoplastic extending from said inlet end to said discharge end;

a shut-off valve body for reciprocating within said nozzle flow passage including actuator means for reciprocation of said valve body;

said reciprocating shut-off valve body having a bore housing a gas pin with a gas pin tip at one end and a gas flow passage within said shut-off valve body bore;

said gas pin controlling an outlet tip orifice having a finite adjustment from 0.001 cm. to 1 cm.;

said gas pin tip having a conical end section and attached to a threaded shaft to provide finite adjustment;

said pin tip conical section having an angle flare of between 1° to 89° degree at the said outlet tip orifice.

4. The nozzle apparatus of claim 1 further comprising an adjustable orifice at said flow passage discharge end.

5. The nozzle apparatus of claim 2 wherein said adjustable pin comprises gas slot passages on the outer diameter of said pin surface and a reduced diameter on said adjustable pin at the discharge end.

6. The nozzle apparatus of claim 1 wherein said actuator means for reciprocation of said valve means comprises:

a cylinder attachment for contacting said valve body;

a cylinder body which reciprocates said cylinder attachment that is attached to said valve body; and a source of pressurized fluid for actuating said cylinder body.

7. The nozzle apparatus of claim 2 comprising means for heating said nozzle body of the shut off valve body wherein the heating means is a cartridge rod heater.

8. The nozzle apparatus of claim 2 wherein said adjustable pin contains gas passages cut on the outer diameter of said pin surface.

9. The nozzle apparatus of claim 2 wherein said adjustable gas pin is supported within said pin housing bore by at least two gas pin outer diameter surfaces extending substantially the length of said pin.

10. The nozzle apparatus of claim 2 wherein said gas pin actuator closes said discharge tip orifice during thermoplastic injection and opens such discharge tip orifice during gas injection and exhaust.

11. The nozzle apparatus of claim 1 wherein said pin means is fixed with a fixed conical section at said flow passage discharge end to produce a jet stream at an inflow of said non-viscous fluid and a restricted orifice shape during exhaust flow, said restricted orifice shape during exhaust producing a choked flow at the front of said flow passage discharge end.

12. The nozzle apparatus of claim 1 wherein said actuator means for reciprocating said valve means is a single round shaped cylinder housing body having a cylinder attachment using a balanced force to actuate said reciprocating valve means, said balanced force applied to the valve means at the center of the cylinder housing attachment.

13. The nozzle apparatus of claim 2 comprising means for positioning said adjustable gas pin during the molding cycle to provide a changing desired gas pressure at said discharge tip orifice.

14. The nozzle apparatus of claim 10 comprising means for reintroducing thermoplastic after gas injection and exhaust.

* * * * *